(No Model.) 2 Sheets—Sheet 1.

A. B. STEBBINS.
VARIABLE SPEED AND POWER GEARING FOR VELOCIPEDES.

No. 523,245. Patented July 17, 1894.

Witnesses.
Robert Erwitt
J. A. Saul

Inventor:
Alfred B. Stebbins.
By
James L. Norris.
Atty.

(No Model.) 2 Sheets—Sheet 2.

A. B. STEBBINS.
VARIABLE SPEED AND POWER GEARING FOR VELOCIPEDES.

No. 523,245. Patented July 17, 1894.

Witnesses.
Robert Everitt.
J. A. Saul.

Inventor.
Alfred B. Stebbins.
By
James L. Norris.
Atty.

UNITED STATES PATENT OFFICE.

ALFRED B. STEBBINS, OF CANISTEO, NEW YORK.

VARIABLE SPEED AND POWER GEARING FOR VELOCIPEDES.

SPECIFICATION forming part of Letters Patent No. 523,245, dated July 17, 1894.

Application filed August 3, 1893. Serial No. 482,299. (No model.)

*To all whom it may concern:*

Be it known that I, ALFRED B. STEBBINS, a citizen of the United States, residing at Canisteo, in the county of Steuben and State of New York, have invented new and useful Improvements in Variable Speed and Power Gearing for Velocipedes, of which the following is a specification.

My invention relates to variable speed and power gearing for bicycles, tricycles, velocipedes, and other vehicles propelled by hand or foot power.

The objects of the invention are to provide a simple and compact gearing so arranged as to be wholly inclosed in a hollow sprocket wheel; to reduce the number and weight of the operating parts in a variable speed gear and diminish the liability to wear and friction; and to provide a simple, effective and easily controlled clutch mechanism whereby in climbing hills the rider, without dismounting, can quickly increase the power but with reduction of speed as compared with the speed possible on level ground.

The invention consists in the features of construction and novel combinations of devices in variable speed and power gearing for vehicles, as hereinafter set forth.

Figure 1:
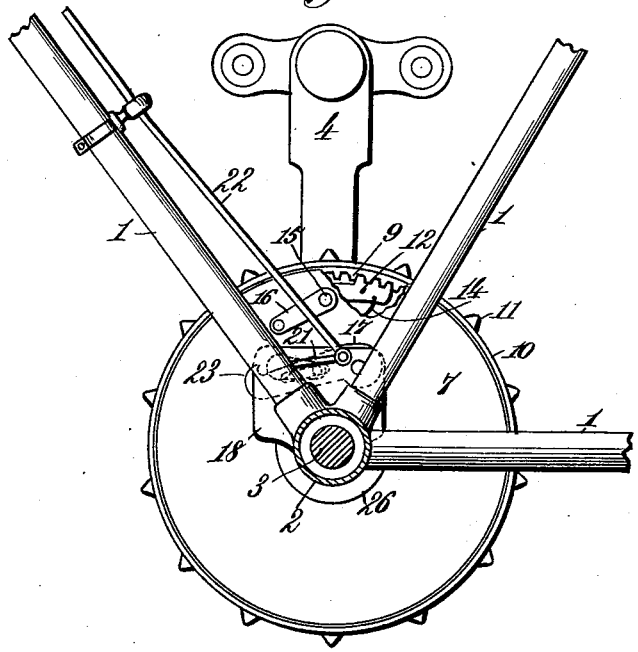
Figure 2:
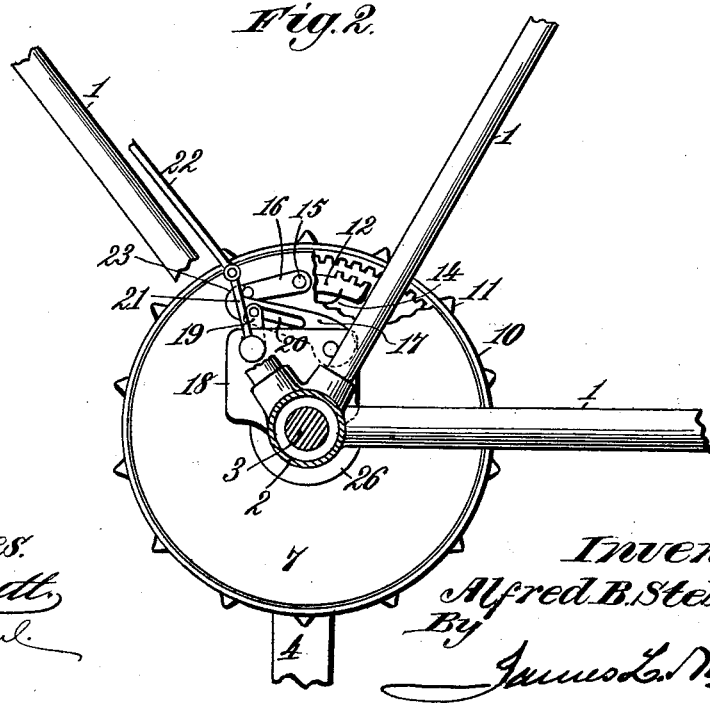
Figure 3:
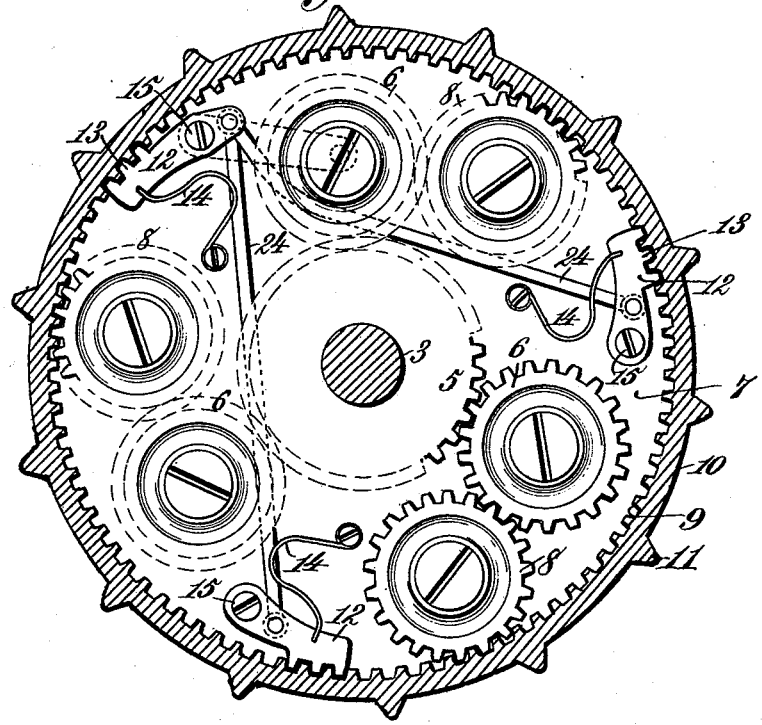
Figure 4:
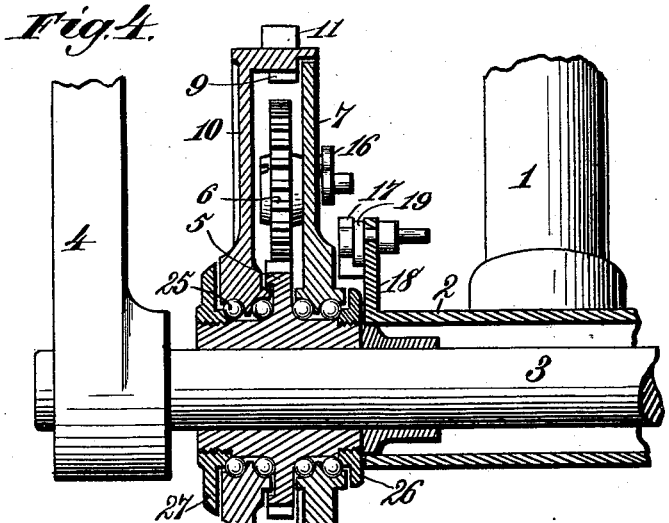

In the annexed drawings illustrating the invention—Figure 1 is a sectional side elevation of my improved variable speed and power mechanism for bicycles, partly broken away to show the clutch engaged with the internal gear of the hollow sprocket wheel. Fig. 2 is a similar view showing the clutch disengaged. Fig. 3 is an enlarged vertical longitudinal section of the hollow sprocket wheel and inclosed reducing gears and clutch mechanism arranged in several sets. Fig. 4 is a vertical transverse section of the same parallel with the driving shaft.

Referring to the drawings, the numeral 1 designates a portion of the stays of a bicycle frame, and 2 is a rigidly supported tubular bearing or bracket, in which is mounted the driving shaft or axle 3 to which the pedals or foot cranks 4 are attached.

To the shaft or axle 3 is secured a spur gear 5 meshing with a gear 6 mounted on a stud supported by a disk 7 that is placed loosely on one end of the hub of the spur gear 5, as shown in Fig. 4. The spur gear 6 meshes with a similar gear 8, Fig. 3, also mounted on the loose disk 7 and meshing in turn with an internal gear 9 formed in the inside of a hollow sprocket wheel 10 that is placed on the other end of the hub of the axle gear 5, and provided externally with teeth or projections 11 for attachment of a sprocket chain to connect with the usual sprocket gear on the axle of the driving wheel.

On the loose disk 7 is pivoted a clutch or dog 12 having a series of teeth 13 adapted to engage normally with the internal gear 9 of the sprocket wheel 10 under the action of a spring 14, Figs. 3 and 4, having one end secured to the disk 7 and the other end bearing on or attached to said dog. Now so long as the dog 12 remains normally in engagement with the internal gear 9 of the sprocket wheel 10, under pressure of the spring 14, the gears 6 and 8 will be held from rotation on their axes and will thus clutch said sprocket wheel with the gear 5 that is fast on the axle 3, thereby binding all the gears together as one body in such manner as to turn only with the cranked axle and permit speeding the vehicle.

The pivot 15 of the clutch or dog 12 is provided on the outside of the loose disk 7 with a crank arm 16, Figs. 1, 2, and 4, in position to be engaged, when desired, by an adjustable stop arm 17 fulcrumed to a plate or lug 18 supported on one end of the fixed tubular bracket 2. To the lug 18 is also fulcrumed a crank arm 19 engaged in a slot 20 of the adjustable stop arm 17, and provided with a lever 21 for connection with an operating rod 22 extended to a point within reach of the hand or foot of the person seated on the bicycle or velocipede. By moving the rod or lever 22 in the proper direction the crank 19 engaged with the stop arm 17 will be caused to throw said stop arm into the path of the crank 16 on the clutch or dog 12, so that in the continued rotation of the disk 7 and sprocket wheel 10 the crank 16 will be swung slightly outward by contact with the outer slightly curved edge of the arm 17 and will become engaged with the stop lug or projection 23 at its end, as shown in Fig. 2. The outward movement of the crank 16 will swing the clutch or dog 12 into such position as to disengage it from the internal gear 9 of the sprocket wheel 10, as shown in Fig. 2, while the engagement of said crank 16 with the lug or catch 23 of the stop arm 17 will prevent further rotation of the loose disk 7 and will hold it immovable. If the cranked axle 3 is now rotated its gear 5 will cause the gears 6 and 8 to rotate on their respective axes and thereby reduce the speed and increase the power imparted to the sprocket wheel, as required in propelling the vehicle on an up grade. The rod or lever 22 can be readily operated without dismounting and thus the speed and power of the propelling mechanism can be quickly varied at will.

In Fig. 3 I have shown three sets of gears, 6 and 8 intermediate the axle gear 5 and internal gear 9 of the sprocket wheel 10, and also three pivoted clutches 12 having a normally spring-pressed engagement with said internal gear. It is obvious, however, that the number of clutches and sets of gears can be varied as desired. One set may ordinarily be sufficient. Where three clutches are employed it is only necessary to provide one of them with the crank arm 16 for co-operation with the adjustable stop arm 17, the said clutch being connected with the others by intermediate arms 24, Fig. 3, so that all the clutches may be adjusted simultaneously.

For the purpose of lessening friction and wear at exposed points, I prefer to employ ball bearings 25 in suitable situations, as shown.

On opposite sides of the axle gear 5 are screw collars 26 and 27 that are arranged to hold the disk 7 and sprocket wheel 10 onto the hub of said gear, said collars being capable of slight adjustment to compensate for wear and to keep all the parts in proper relative position.

It will be observed that the disk 7 and hollow sprocket wheel 10 serve together as a casing for the speed reducing gears. By mounting the intermediate gears 6 and 8 and clutches 12 directly on the inner side of the loose disk 7 the wearing parts are reduced to a small number and brought within a compact space, the liability to wear and friction is greatly diminished, and provision is made for a simple and uncomplicated clutch mechanism through which the speed or power of the propelling devices can be quickly varied or controlled without shock and with great readiness and certainty.

By mounting the sprocket wheel 10 and accompanying disk 7 on ball bearings 25, as shown in Fig. 4, the injurious effects of friction at this point are avoided and the operation of the driving mechanism is greatly facilitated.

What I claim as my invention is—

1. The combination of the driving shaft or axle provided with a spur gear, a loosely mounted hollow sprocket wheel provided with an internal gear and inclosing the axle-gear, a loosely mounted disk closing the side of the hollow sprocket wheel, intermediate gears mounted on said loose disk and connecting the axle-gear with the internal gear of the sprocket wheel, a clutch or dog mounted on the loose disk in normally spring-pressed engagement with the internal gear of the sprocket wheel to bind all the gears together for speeding the sprocket wheel, a crank connected to the clutch or dog and projecting on the outside of the loose disk, a fixed lug having an adjustable stop-arm pivoted thereto, a crank pivoted to said lug and engaged with the stop arm, and lever connections to said crank for causing it to throw the stop arm into the path of the crank on the dog or clutch and thereby disengage the clutch from the internal gear of the sprocket wheel and lock the loose disk in a fixed position to permit rotation of the intermediate gears on their axes so as to reduce the speed and increase the power of the sprocket wheel, substantially as described.

2. The combination of the rigidly supported tubular bracket 2 provided with lug 18, the driving shaft or axle 3 having the spur gear 5 secured thereto, the loosely mounted hollow sprocket wheel 10 provided with internal gear 9, the loosely mounted disk 7 closing one side of the hollow sprocket wheel, the intermediate gears 6 and 8 mounted on the inner side of said disk and connecting the axle-gear 5 with the internal gear 9 of the sprocket wheel, the pivoted clutch 12 having spring 14 and crank arm 16, the slotted stop arm 17 fulcrumed to the fixed lug 18, the crank 19 pivoted to said lug and engaged in the slot of the adjustable stop arm, and lever connections 21 and 22 for operating the clutch mechanism, substantially as described.

3. The combination of the driving shaft or axle 3 having gear 5 secured thereto, the loosely mounted hollow sprocket wheel 10 having internal gear 9, the loosely mounted disk 7, several sets of intermediate gears 6 and 8 mounted on said loose disk and connecting the axle gear 5 with the internal gear of the hollow sprocket wheel, a series of pivoted dogs or clutches 12 mounted on the loose disk in normal spring-pressed engagement with the internal gear of the sprocket wheel to bind all the gears together to rotate as one body, rods 24 connecting the several clutches, and lever mechanism to disengage said dogs or clutches from the internal gear of the sprocket wheel and permit its rotation with increased power and reduced speed through the released intermediate gears, substantially as described.

In testimony whereof I have hereunto set my hand in presence of two subscribing witnesses.

ALFRED B. STEBBINS.

Witnesses:
GEO. N. STRONG,
B. C. BROWN.